3,129,237
PROCESS FOR THE PREPARATION OF BIS-HYDROCARBON COMPOUNDS OF CHROMIUM

Lawrence G. Hess, Charleston, and Everett A. Mailey, St. Albans, W. Va., assignors to Union Carbide Corporation, a corporation of New York
No Drawing. Filed Dec. 16, 1960, Ser. No. 76,090
6 Claims. (Cl. 260—438)

This invention relates to the preparation of certain organo-metallic compounds. More particularly, this invention relates to an improved process for the preparation of bishydrocarbon compounds of chromium.

The process employed for the preparation of bis-hydrocarbon-chromium compounds prior to this invention was the Fischer-Hafner synthesis followed by a reduction of the resulting reaction mixture. This process can be illustrated by the following schematic equations, using the preparation of dicumenechromium as an example:

Fischer-Hafner synthesis:

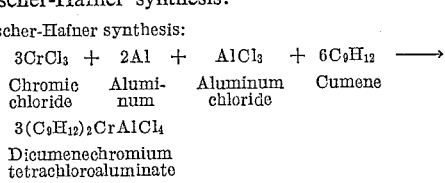

Reduction:

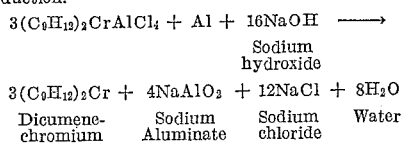

In practice, the reaction mixture from the Fischer-Hafner synthesis was transferred to a second vessel where powdered aluminum was added to the mixture. The aluminum-containing mixture was then transferred to a third vessel where the reduction of the organo-chromium-aluminum chloride complex was conducted. This process was unsatisfactory, however, due to the problems which arose with the use of aluminum in the reduction step. For example, if sufficient aluminum for both the Fischer-Hafner synthesis and the reduction reaction was charged to the first step, the transfer of the reaction mixture to the second, or mixing vessel was incomplete due to the sludge of aluminum that was formed in the first reactor. If, as indicated above, the aluminum was added to the reaction mixture while in the second vessel, there still remained the problem of clogging of the valve between the second vessel and the reactor for the reduction step. Addition of the aluminum directly to the third vessel was also unsatisfactory because of heat generated by the highly exothermic reaction of the aluminum with the sodium hydroxide. Although the addition of the aluminum to the reduction vessel can be controlled to prevent such heat evolution it is difficult and requires expensive special equipment. In addition to handling problems such as those enumerated above, the use of aluminum in the reduction step complicated recovery of the product. After the reduction step was carried out, an organic and an aqueous phase were allowed to separate out, with the organo-chromium compound being contained in the organic phase. The additional metallic aluminum and aluminum compounds, primarily aluminum hydroxide, caused emulsification at the interface of the aqueous and organic phases, making a sharp separation impossible and preventing easy product recovery. The emulsification can be avoided by the addition of more sodium hydroxide, which adds to the expense of the process.

It has now been discovered that the above-described problems are substantially eliminated when chromous chloride is substituted for chromic chloride in the Fischer-Hafner synthesis, for the reduction step is eliminated, and with it the problems accompanying the use of aluminum in that step. In addition, the process is more economical due to the deceased requirements of aluminum and sodium hydroxide.

The process of this invention essentially comprises reacting chromous chloride with an aromatic hydrocarbon compound in the presence of particulate metallic aluminum and aluminum chloride and recovering a bis-hydrocarbonchromium compound from the resulting reaction mixture.

The compounds that can be produced by the process of this invention can be represented by the following structural formula:

$$(Ar)_2Cr$$

wherein Ar represents an aromatic hydrocarbon moiety. These compounds can be characterized as addition compounds in contrast to organo-metallic substitution compounds wherein a hydrogen or other organic substituent in the organic nucleus is substituted or removed in the formation of the organo-metallic compound. Thus, the compounds produced according to the process of the present invention are to be distinguished from those formed by the chemical bonding of a cyclopentadienyl radical with an element (Fischer and Pfab, Zeit. für Naturforschung, 7b, p. 377 (1952)) and phenyl mercuric compounds, e.g. phenyl mercuric acetate (U.S. Patent 2,502,222). Formation of such substitution compounds involves elimination of one hydrogen on the cyclopentadiene or benzene nucleus. In the case of the compounds produced by the process of the instant invention the chemical union of the chromium with the aromatic compound does not involve elimination of hydrogen or any other substituent on the benzene nucleus. These products can therefore be regarded as addition products of chromium with the aromatic molecule.

Aromatic compounds that can be utilized in the process of this invention are those having at least one isolated benzene ring system. As employed in this application the term "isolated benzene ring system" means a benzene carbon ring contained in a fused ring compound containing a benzene carbon ring wherein, by the Kekule formulation, any double bond in a ring fused to such benzene carbon ring is removed from the benzene ring atom nearest to it by at least two carbon atoms of the ring fused to the benzene ring, and a compound having one or more aliphatic substituents on a benzene ring wherein any double bond external to the carbon ring is removed from the benzene ring carbon atom nearest to it by at least two carbon atoms external to such benzene carbon ring. Thus, benzene, alkyl substituted benzenes, aralkyl substituted benzenes, indan, tetrahydronaphthalene, 9,10-dihydroanthracene, 9,10-dihydrophenanthrene and allyl benzene are examples of aromatic compounds containing an isolated benzene ring system. By contrast naphthalene, indene, anthracene, phenanthrene and styrene are examples of aromatic compounds which do not contain an isolated benzene ring.

The inapplicability in the present invention of compounds which do not contain an isolated benzene ring, as contrasted with the applicability with compounds which do contain such a ring, results from essentially different characteristics of the two types of compounds with respect to their aromatic nature. The fusion of a benzene ring to another aromatic ring in conjugated relation thereto, or linkage of a ring carbon atom of a benzene ring to an unsaturated aliphatic radical wherein the ring carbon is linked to an aliphatic carbon atom which in turn is linked by a double bond to another aliphatic carbon atom, may be considered as orienting the double bonds in the benzene ring, thus producing a ring structure of less reactivity than is characteristic of an isolated benzene ring and rendering the electrons in the double bonds of the benzene ring unavailable for reaction with the chromium halide. This essential characteristic may also be explained upon energy considerations. The fusion of an aromatic ring to the benzene ring in conjugated relation and the inclusion of an unsaturated aliphatic radical on the benzene ring with the unsaturation in the aliphatic constituent being in conjugated relation with double bonds in the benzene ring may be considered as decreasing the energy and concommitantly increasing the stability of the ring to such a point that the compounds are unreactive for the purposes of this invention.

We have also found that the process of this invention may be utilized employing aryl substituted aromatic hydrocarbon compounds as, for example, polyphenyls such as diphenyl, phenylnaphthalene, phenylanthracene and phenylphenanthrene, although they do not contain an isolated benzene ring.

Particularly preferred aromatic hydrocarbons are those having from 6 to about 18 carbon atoms. Examples of such compounds are benzene, toluene, o-zylene, m-xylene, p-xylene, hemimellitene, pseudocumene, mesitylene, prehnitene, isodurene, durene, pentamethylbenzene, hexamethylbenzene, ethylbenzene, n-butylbenzene, t-butylbenzene, p-cymene, 1,3,5-triethylbenzene, hexaethylbenzene, allyl benzene, 4-benzyl-1-butene, 4-benzyl-2-butene, 5-benzyl-1-pentene, 5-benzyl-2-pentene, 1-benzyl-2- pentene, 9,10-dihydrophenanthrene, 9,10-dihydroanthracene, indane, 1,2,3,4-tetrahydronaphthalene, diphenyl, o-terphenyl, m-terphenyl, p-terphenyl, and the like.

The chromous chloride employed in the process of this invention should be essentially anhydrous. Chromous chloride can be prepared by any of several processes, such as by the reduction of chromic chloride with hydrogen and hydrogen chloride vapors, the electrolysis of chromic chloride to chromous chloride and chlorine, the reaction of chromous acetate with hydrochloric acid and the reaction of chromium metal with hydrochloric acid.

The ratio of chromous chloride to aromatic hydrocarbon compound in the process of this invention is from about 1:2 to about 1:25. The preferred molar ratio is from about 1:2 to about 1:12.

The aluminum employed in the process of this invention is preferably powdered because a smaller particle size gives a greater surface area per unit weight and hence a greater reactivity per unit weight. The mole ratio of chromous chloride to powdered aluminum in the initial reaction mixture is from about 1:0.4 to about 1:5, preferably from about 1:0.4 to about 1:1.1.

The aluminum chloride employed in the process of this invention should be anhydrous and is preferably finely divided to provide greater reactivity. The mole ratio of chromous chloride to aluminum chloride in the initial reaction mixture is from about 1:1 to about 1:4. The preferred molar ratio is from about 1:1.67 to about 1:2.67.

The reaction is preferably conducted in three steps, comprising a mixing period, a first heating period and a second heating period. The mixing period is conducted at ambient temperatures for a period of up to about one hour. Although the mixing period is not necessary for the practice of the process of this invention, it is preferably employed to permit formation of complex intermediate compounds prior to the first heating period. The first heating period is conducted at temperatures of from about 70° C. to about 110° C. for a period of from about 2 to about 10 hours, preferably at 100° C. for about 4 hours. After the first heating period, the reaction mixture is heated at about reflux temperatures, generally from about 110° C. to about 150° C. for a period of from about 5 minutes to about 5 hours, and preferably at a temperature of about 130° C. for a period of about 1 hour. The use of the second heating period gives a slight increase in the yield of the organo-chromium compound over the yield obtained when the second heating period is omitted. Accordingly, this second heating period is preferably employed, but is not absolutely necessary for the process of the instant invention.

The bis-hydrocarbon chromium compound can be recovered from the reaction medium by introducing the reaction mixture into a well-stirred mixture of an organic solvent and an aqueous alkali metal hydroxide, permitting two layers, aqueous and organic, to settle out, separating the two layers and recovering the bis-chromium compound from the organic layer by distillation.

Any alkali metal hydroxide, such as lithium hydroxide, sodium hydroxide, potassium hydroxide, and the like can be employed. Sodium hydroxide is preferred.

The amount of alkali metal hydroxide employed is determined by the amount that would be required to react with, and neutralize, the reactants initially charged to the reaction according to the following equations:

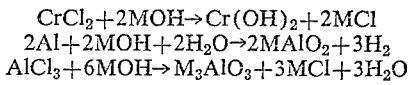

wherein M is an alkali metal. Thus, for each mole of aluminum charged to the initial reaction, 1 mole of alkali metal hydroxide is use; for each mole of chromous chloride charged to the initial reaction, 2 moles of alkali metal hydroxide are used; and for each mole of aluminum chloride charged to the initial reaction, 6 moles of alkali metal hydroxide are used. It is preferred that an excess of alkali hydroxide, as determined according to the above procedure, be used. This excess can be up to about 500 percent excess or more although from about 10 to about 30 percent excess is preferably employed.

The amount of water employed in the alkali metal hydroxide solution is at least 50 moles of water per mole of chromous chloride originally charged to the process of this invention. It is preferred, however, to employ from about 50 to about 1000 or more moles of water per mole of chromous chloride.

Any organic solvent that is immiscible with the aqueous alkali metal hydroxide solution and is a solvent for the bis-hydrocarbon compound can be employed to recover the bishydrocarbon chromium compound. Accordingly, aromatic hydrocarbons, such as benzene, toluene, cumene, and other alkyl benzenes; aliphatic hydrocarbons, such as hexane, heptane and dodecane; cycloaliphatic hydrocarbons, such as cyclohexane and ethyl cyclohexane; halogenated hydrocarbons, such as diethylene chloride; ethers, such as diethyl ether, dibutyl ether, diisopropyl ether, and dioxane; alcohols, such as the nonyl alcohols and the dodecyl alcohols can all be employed.

The amount of solvent employed is not critical, although sufficient solvent to recover the organo-chromium compound should be employed. In general, at least 3 moles of solvent per mole of chromous chloride charged should be employed, although from about 3 to about 35 moles of solvent per mole of chromous chloride charged are preferably employed.

The aqueous alkali metal hydroxide-organic solvent mixture should be oxygen-free to prevent oxidation of the bis-hydrocarbon chromium compounds. Oxygen-free mixtures can be obtained by bubbling oxygen-free nitrogen or other inert gas through the mixture for from about 15 minutes to about 1 hour or more prior to addition of the reaction mixture to the alkali metal hydroxide-organic solvent mixture.

The alkali metal hydroxide-organic solvent mixture should be maintained at temperatures of from about −20° C. to about 50° C., while the reaction mixture containing the organo-chromium compound is being added to the alkaline mixture. The addition is preferably conducted at a temperature of about 0° C. The reaction mixture can be added to the alkali metal hydroxide-organic solvent mixture or vice versa. It is preferred, however, to add the reaction mixture to the aqueous alkali metal hydroxide-organic solvent mixture. The addition can be carried out rapidly provided there is no localized or general heating of the mixture. The resulting mixture should be allowed to stand at temperatures of from about −15° C. to about 50° C. for from about 0.25 to about 6 hours, preferably at from about 15° to about 20° C. for about 3 hours, after the addition, with stirring. The mixture is then allowed to settle and the lower, aqueous, layer is drawn off and discarded. The upper, organic layer, containing the bis-hydrocarbon chromium compound, is then distilled at reduced pressure. The distillation can be preceded by a wash of the organic solution if desired. The maximum temperature during distillation should be such that decomposition of the hydrocarbon-chromium compound is avoided. In general, the compounds produced according to the process of this invention decompose at about 200° C. Thus, the distillation can generally be conducted at less than about 200° C. although, temperatures of less than about 150° C. are preferred.

The entire process, including the recovery of the bis-hydrocarbon chromium compound, is conducted in an oxygen-free atmosphere. Oxygen-free gases such as nitrogen, argon, methane, ethane, and other inert hydrocarbon gases can be satisfactorily employed to provide an inert atmosphere.

In a preferred embodiment of the process of this invention chromous chloride, aluminum, aluminum chloride and an organic compound are charged to a reactor in the molar ratios of 1:0.77:1.67:3, respectively, and the resulting mixture is held at ambient temperatures, with agitation, for about 1 hour. The reaction mixture is then heated to about 100° C. and held at that temperature, with agitation, for 4 hours. Finally, the mixture is heated at reflux temperatures with agitation, for about 1 hour. The reaction mixture is then added, over a period of 2 hours, to an agitated, de-oxygenated mixture of heptane and an aqueous sodium hydroxide solution, maintaining the mixture at about 0° C. throughout the addition. The mixture is then held at 0° C. with agitation for 3 hours, after which it is permitted to become quiescent. Of the two phases that settle out, the lower, aqueous, phase is discarded, while the upper, organic, phase is washed with de-oxygenated water and distilled under reduced pressure. Heptane and excess, unreacted organic compounds are removed as an overhead fraction cut. The organo-chromium compound is then distilled off under vacuum at a temperature of less than about 150° C. under vacuum. The entire process is conducted under a nitrogen blanket.

The following examples are cited to further illustrate the process of this invention.

*Example I*

To a 2-liter, low actinic (amber-colored) glass flask were added 122.9 grams (1.0 mole) of chromous chloride, 20.8 grams (0.77 mole) of aluminum powder, 223.0 grams (1.67 moles) of aluminum chloride, and 840 grams (7.0 moles) of cumene. The resultant mixture was stirred, first at ambient temperature for one hour, then at 100–105° C. for four hours, and finally at the reflux temperature of the mixture (137–140° C.) for one hour. The resulting reaction mixture, after cooling to about 25 to 30° C. and transferring to a feed vessel, was added to a cold, stirred, and deoxygenated mixture of one liter of heptane and an aqueous alkaline solution of 600 grams of sodium hydroxide in five liters of water. The alkaline mixture was maintained at 0° C. during the addition of said reaction mixture, which was added over a period of two hours. The resulting mixture was stirred an additional three hours and then was transferred in two portions to a 4-liter separatory funnel. The aqueous layer was drawn off and was discarded. The organic layer was washed once with one liter of deoxygenated water and was transferred to a 2-liter distilling flask that was equipped with a packed column, thermowell, and a nitrogen ebullator. The heptane, cumene, and low-boiling compounds were distilled off, first at atmospheric pressure, then at reduced pressure, so that the kettle temperature never exceeded 135° C. The black, slightly viscous dicumenechromium was distilled at 130–133° C. at an absolute pressure of 0.10–0.20 mm. of mercury. A yield of 53 percent of dicumenechromium was obtained, based on the chromous chloride. A nitrogen blanket was maintained over the reaction mixtures and product throughout the entire process.

*Example II*

The same procedure as in Example I was used except that 355.0 grams (2.67 moles) of aluminum chloride and 29.7 grams (1.1 moles) of aluminum powder were used instead of the quantities used in the foregoing example. A de-oxygenated, aqueous alkaline solution of 800 grams of sodium hydroxide and five liters of water was used to effect the recovery of dicumenechromium. A yield of 51.5 percent dicumenechromium was obtained.

*Example III*

The same procedure and molar quantities as in Example I were used, except that the alkaline solution was added to the initial reaction mixture. A yield of 48 percent dicumenechromium was obtained.

*Example IV*

To a 2-liter, low actinic (amber-colored) glass flask were added 123 grams (1.0 mole) of chromous chloride, 23.5 grams (0.87 mole) of aluminum metal, 223 grams (1.67 moles) of aluminum chloride, and 339 grams (2.2 moles) of biphenyl. The resultant mixture was stirred at ambient temperatures for a period of 15 minutes, at 100–105° C. for four hours, and at 133–137° C. for one hour. The resultant mixture was then cooled slowly to 80° C. at which time 800 ml. of toluene was added with continued stirring over a 15-minute period. Then the mixture, after being cooled and transferred to an additional vessel, was added to a cold, stirred, de-oxygenated, alkaline mixture containing 500 ml. of heptane, 800 grams of sodium hydroxide, and five liters of water. The alkaline mixture was maintained at 0° C. during the addition of the organo-chromium salt mixture, which was added over a period of two hours. The resultant mixture was stirred an additional two hours and then was transferred in two portions to a 4-liter separatory funnel. The aqueous layer was drawn off and was discarded. Bis-(biphenyl) chromium could be recovered from the organic layer in a yield of about 40 percent, based upon chromous chloride.

*Example V*

Employing the procedures of Examples I to IV di-(9,10-dihydrophenanthrene) chromium is prepared by reacting 1 mole of chromium chloride with 0.77 mole of aluminum powder, 1.67 moles of aluminum chloride, and 3 moles of 9,10-dihydrophenanthrene.

*Example VI*

Employing the procedures of Examples I to IV di-(allylbenzene)chromium is prepared by reacting 1 mole of chromous chloride with 0.77 mole of aluminum powder, 1.67 moles of aluminum chloride, and 3 moles of allylbenzene.

*Example VII*

Employing the procedures of Examples I to IV di-hexamethylbenzene chromium is prepared by reacting 1 mole of chromous chloride with 0.77 mole of aluminum powder, 1.67 moles of aluminum chloride, and 3 moles of hexamethylbenzene.

*Example VIII*

Employing the procedures of Examples I to IV di-indanchromium is prepared by reacting 1 mole of chromous chloride with 0.77 mole of aluminum powder, 1.67 moles of aluminum chloride, and 3 moles of indan.

*Example IX*

Employing the procedures of Examples I to IV di-(p-terphenyl)chromium is prepared by reacting 1 mole of chromous chloride with 0.77 mole of aluminum powder, 1.67 moles of aluminum chloride, and 3 moles of p-terphenyl.

We claim:

1. The process for producing organo-chromium compounds which comprises reacting an organic aromatic hydrocarbon compound selected from the group consisting of an aromatic hydrocarbon compound having an isolated benzene ring and aryl substituted benzenes, said aromatic hydrocarbon compound having from 6 to 18 carbon atoms with chromous chloride, unalloyed aluminum, and aluminum chloride in the proportions of 1 mole of chromous chloride to from about 2 to about 25 moles of said aromatic hydrocarbon compound, to from about 0.4 to about 5 moles of aluminum, to from about 1 to about 4 moles of aluminum chloride at a temperature of from about 70° C. to about 110° C.

2. The process of claim 1 wherein the aromatic hydrocarbon compound is cumene.

3. The process of claim 1 wherein the aromatic hydrocarbon compound is biphenyl.

4. The process for producing dicumene chromium which comprises reacting chromous chloride, with aluminum chloride, aluminum and cumene in the proportions of 1 mole of chromous chloride to from about 0.4 to about 1.1 moles of aluminum, to from about 1.67 to about 2.67 moles of aluminum chloride, to from about 2 to about 12 moles of cumene at ambient temperature with agitation for up to about 1 hour, heating the reaction mixture at about 100° C. for about 4 hours and at reflux temperatures for up to about 1 hour, and recovering dicumene chromium.

5. The process for producing di-biphenylchromium which comprises reacting chromous chloride, aluminum chloride, aluminum and biphenyl in the proportions of 1 mole of chromous chloride to about 0.4 to about 1.1 moles of aluminum, to from about 1.67 to about 2.67 moles of aluminum chloride to from about 2 to about 12 moles of biphenyl at ambient temperature with agitation for up to about 1 hour, heating the reaction mixture at about 100° C. for about 4 hours and at reflux temperatures for up to about 1 hour, and recovering di-biphenylchromium.

6. The process for producing organo-chromium compounds which comprises reacting an organic aromatic hydrocarbon compound selected from the group consisting of an aromatic hydrocarbon compound having an isolated benzene ring and aryl substituted benzene, said aromatic hydrocarbon compound having from 6 to 18 carbon atoms, with chromous chloride, aluminum, and aluminum chloride in the proportions of 1 mole of chromous chloride to from about 0.4 to about 1.1 moles of aluminum, to from about 1.67 to about 2.67 moles of aluminum chloride, to from about 2 to about 12 moles of said aromatic hydrocarbon compound at ambient temperature with agitation for up to about 1 hour, heating the reaction mixture at a temperature of from 70° C. to 110° C. for from 2 to 10 hours, and then at reflux temperatures for from 5 minutes to 5 hours.

References Cited in the file of this patent

UNITED STATES PATENTS

| | | |
|---|---|---|
| 2,892,857 | Ecke et al. | June 30, 1959 |
| 2,953,586 | Hafner et al. | Sept. 20, 1960 |

OTHER REFERENCES

J.A.C.S., vol. 78, No. 22, Nov. 20, 1956.